United States Patent
Sano et al.

(10) Patent No.: US 6,841,904 B2
(45) Date of Patent: Jan. 11, 2005

(54) RESOLVER TERMINAL ATTACHMENT STRUCTURE

(75) Inventors: Satoshi Sano, Tokyo (JP); Naofumi Kumagai, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/404,059

(22) Filed: Apr. 2, 2003

(65) Prior Publication Data

US 2004/0046464 A1 Mar. 11, 2004

(30) Foreign Application Priority Data

Apr. 3, 2002  (JP) ........................................ 2002-101179

(51) Int. Cl.$^7$ ............................................... H02K 11/00
(52) U.S. Cl. ........................................ 310/71; 310/258
(58) Field of Search .......................... 310/71, 254, 179, 310/258–260

(56) References Cited

U.S. PATENT DOCUMENTS

| | | | | |
|---|---|---|---|---|
| 5,229,674 A | * | 7/1993 | Best | ............................ 310/71 |
| 5,243,246 A | * | 9/1993 | Sakamoto | .................... 310/179 |
| 5,828,147 A | * | 10/1998 | Best et al. | ..................... 310/71 |
| 5,920,135 A | | 7/1999 | Ohshita | |
| 6,028,383 A | | 2/2000 | Ohshita | |
| 6,044,545 A | | 4/2000 | Ohshita | |
| 6,429,557 B2 | * | 8/2002 | Sheeran et al. | ............... 310/71 |

FOREIGN PATENT DOCUMENTS

| | | |
|---|---|---|
| JP | A-59-70163 | 8/1984 |
| JP | A-10-201160 | 7/1998 |

* cited by examiner

*Primary Examiner*—Thanh Lam
(74) *Attorney, Agent, or Firm*—Adduci, Mastriani & Schaumberg, LLP

(57) ABSTRACT

A resolver terminal attachment structure for a resolver (500) including a stator core (1) constructed from multiple laminated plates providing multiple stationary magnetic poles (3) with attendant stationary magnetic pole teeth (4) that protrude in a direction that faces the center of a stator yoke (2), the magnetic poles adapted to accept a stator winding, includes a lead wire fixture (6), which electrically couples the stator winding to a lead wire (204) via attachment pins(7), and two protrusions (2a, 2b) formed integrally and unitarily with the stator core at the outside of the stator core for supporting the lead wire fixture between the protrusions.

6 Claims, 5 Drawing Sheets

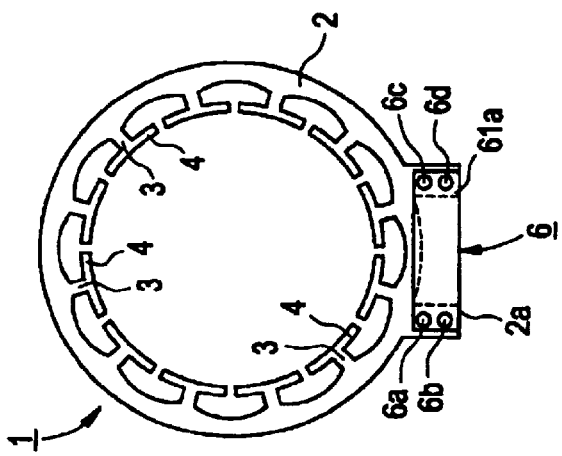
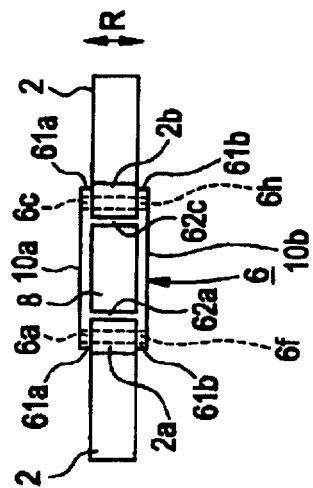
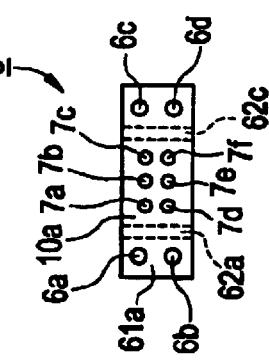
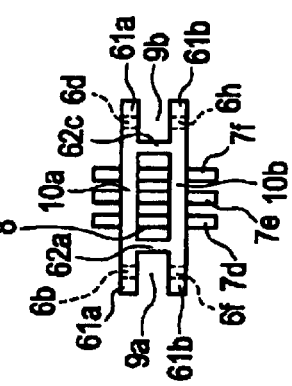
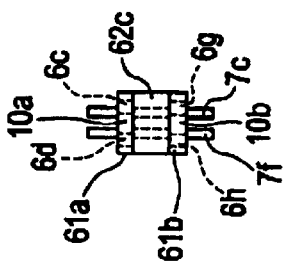

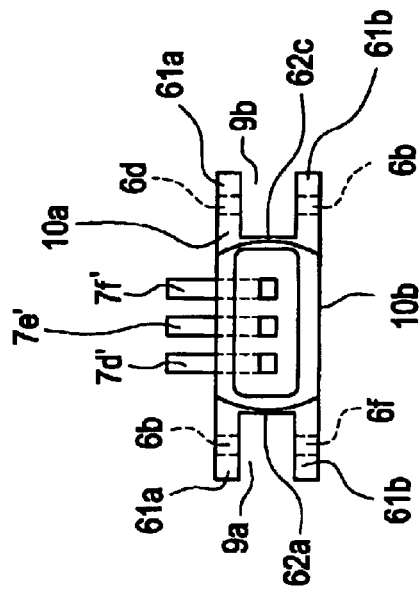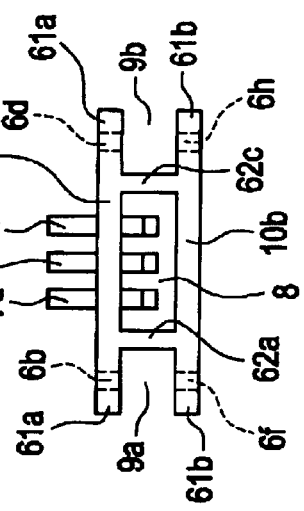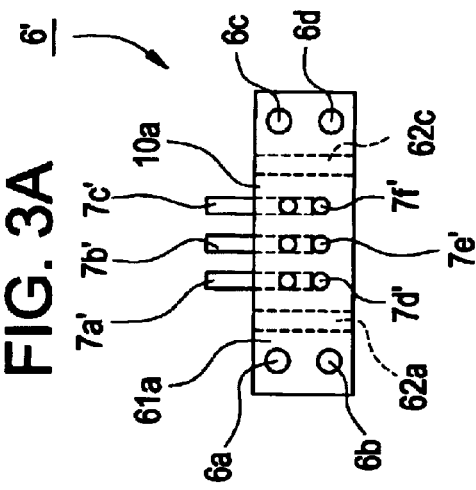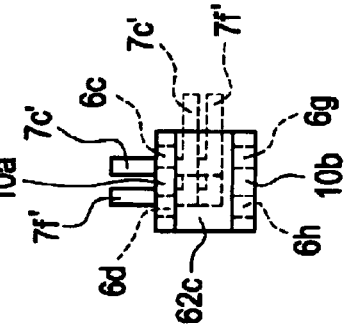

RESOLVER TERMINAL ATTACHMENT STRUCTURE

BACKGROUND OF THE INVENTION

The present invention relates generally to a rotating machine. More specifically, the present invention relates to structure for attaching terminals to the stator of a rotating machine, e.g., a resolver.

The present invention claims priority from Japanese Patent Application No. 2002-101179, which was filed on Apr. 3, 2002, and which is incorporated herein by reference for all purposes.

Resolvers have been employed in myriad systems where, for example, rotation position detection is required. One known class of resolver is the variable reluctance resolver. In the variable reluctance resolver 500 depicted in FIGS. 5 and 6, multiple magnetic poles 3 protrude from a circular yoke 2 on to which poles a stator winding (not shown) is wound. It will be appreciated that the stator accommodates and receives a rotor (also not shown), as discussed below. See also copending, commonly-assigned U.S. patent application No. 2002/0063491 A1 to Kobayashi et al., which claims priority from Japanese Patent Application No. JP02002171737A.

Still referring to both FIGS. 5 and 6, a stator assembly 520 of a typical variable reluctance resolver 500 is formed by using a first stator magnetic pole assembly 55, which is provided with a component attachment portion 57, and a second stator magnetic pole assembly 56, which assemblies flank respective sides of the circular stator core 1. As discussed below, the core 1 consists of a stack of soft metallic magnetic plates, e.g., silicon steel plates.

In FIG. 5, both ends of the stator core 1 are flanked, and consequently the stator core assembly 520 including the first stator magnetic pole assembly 55, and the second stator magnetic pole assembly 56, are enclosed by a synthetic resin 201 in such a way that the surfaces of the magnetic pole teeth 4 of the stator core 1, i.e., the teeth that face a rotor (not shown), are left exposed. The inside portions of the stationary magnetic pole teeth 4 of the stator core 1 are such that they oppose the outside surface of the rotor (not shown) when the rotor is disposed in the interior of the stator assembly 520.

The first stator magnetic pole assembly 55 and the second stator magnetic pole assembly 56 are joined by the synthetic resin 201, which is forced through multiple fixing holes 203, which are through holes provided in the stator core 1. The synthetic resin 201 forms a uniform circular surface with the inside portions of the stationary magnetic pole teeth 4, which portions are not covered by the synthetic resin 201. In addition, the synthetic resin 201 also partially, if not fully, saturates the windings of the stator assembly 520 in which the stator winding (not shown) is disposed, and secures the stator magnetic pole assemblies 55, 56 to the stator core 1. The stator magnetic pole assembly fixing holes 203 pass through the stator core 1 proximate to the outer periphery of the stator magnetic pole assemblies 55, 56. The resin 201 fills the stator magnetic vole assembly fixing holes 203 completely, encloses the stator magnetic vole assemblies 55, 56, and secures the stator magnetic role assemblies 55, 56 to the stator core 1.

The first stator magnetic pole assembly 55 has a structure in which a component attachment portion 57 is provided, while the second stator magnetic pole assembly 56 lacks a component attachment portion 57. The interior of the component attachment portion 57 is not covered by the synthetic resin 201; a potting material 400 is injected to plug up the exposed portions. A lead wire or lead wire bundle 204 is drawn out from the component attachment portion 57 into which the potting material 400 has been injected; the lead wire bundle is such that it can be externally connected to a wiring harness (not shown).

FIG. 6 is an exploded view of the stator assembly 520 shown in FIG. 5. Multiple stator magnetic pole assembly fixing holes 203 provided in the stator core 1 pass through the stator core 1, which is formed by a laminated stack of steel plates 1a–1n. The synthetic resin 201 penetrates the stator magnetic pole assembly fixing holes 203 and contacts the first stator magnetic pole assembly 55 and the second stator magnetic pole assembly 56 to secure them to the stator core 1. The synthetic resin 201 consists of a material that has a coefficient of thermal expansion of $0.00003/cm/cm/°C.$, such as PBT glass (30%). The first stator magnetic pole assembly 55 and the second stator magnetic pole assembly 56 each consist of a material that has a coefficient of thermal expansion of $0.00003/cm/cm/°C.$, such as PBT glass (30%). It will be noted that a coil winding portion 510, which has the same shape and quantity of protrusions as the stationary magnetic pole portion 3 and the magnetic pole teeth 4 of the yoke 2, is provided on each of the stator magnetic pole assemblies 55, 56.

Thus, the first stator magnetic pole assembly 55, the laminated stator core 1, and second stator magnetic pole assembly 56, are stacked such that the stationary magnetic pole teeth 4 provided on the stationary magnetic pole portion 3 of the stator core 1 and the coil winding portions 510 of the first and second stator magnetic pole assemblies 55, 56 are aligned with one another.

In addition to the fastening function provided by the through holes 203 and synthetic resin 201, two component attachment portion fixing holes 401c and 401d are provided in and pass through the laminated stator core 1. When encapsulating the first stator magnetic pole assembly 55 and the second stator magnetic pole assembly 56 with a synthetic resin 201, the synthetic resin 201 passes through additional (and adjacently positioned) through holes 401a and 401b, which are provided in the component attachment portion 57, to further secure the component attachment portion 57 to the stator core 1.

As mentioned above, a stator winding (not shown) is wound around the coil winding, e.g., magnetic poles 3, of the stator assembly 520 assembled as described above using a predetermined winding pattern, and the ends of the windings are connected to attachment pins (also not shown) associated with the component attachment portion 57 and secured to the first stator magnetic pole assembly 55 and second stator magnetic pole assembly 56. Then the stator assembly 520 is enclosed with the synthetic resin 201. The component attachment portion 57 is such that the potting material 400 (see FIG. 5), which has a coefficient of thermal expansion of $0.000046/cm/cm/°C.$, such as epoxy resin, is injected to plug up the exposed portions, e.g., the attachment pins.

Analysis of this assembly method reveals the following problems. Specifically, in the draw-out structure of a conventional lead wire, the structure is such that after the stator winding is wound, the ends of the winding are connected to attachment pins (not shown) of the component attachment portion 57, and the lead wire is drawn out to the exterior of the stator assembly 520. The component attachment portion 57 becomes an integral structure with the first stator magnetic pole assembly 55, which is formed of resin. For this reason, when an external force is applied to the component attachment portion 57, there are cases where the component attachment portion 57 ruptures at its boundary with the first stator magnetic pole assembly 55. In addition, when an external force is applied to the component attachment portion 57, an external force is also applied to the stator winding that is wound on the coil winding portions 510 of the final stator assembly 520, since it is an integral unit with the first stator magnetic pole assembly 55. Given that external force, there are cases where the windings short, and resolver reliability decreases. In addition, when the first stator magnetic pole assembly 55 becomes an integral structure with the component attachment portion 57, its structure becomes complex. Moreover, the shapes of the first and second magnetic pole assemblies 55, 56 differ from one another. Since there is a need to use stator magnetic pole assemblies that have respectively different shapes, it is difficult to reduce resolver prices.

What is needed is a resolver terminal attachment structure that is highly reliable. Moreover, what is needed is a resolver terminal attachment structure that permits construction of a low cost resolver.

SUMMARY OF THE INVENTION

Based on the above and foregoing, it can be appreciated that there presently exists a need in the art for a resolver terminal attachment structure that overcomes the above-described deficiencies. The present invention was motivated by a desire to overcome the drawbacks and shortcomings of the presently available technology, and thereby fulfill this need in the art.

According to one aspect, the present invention provides a terminal attachment structure for electrically coupling a rotating machine, having a stator core constructed from multiple laminated plates providing multiple stationary magnetic poles with attendant stationary magnetic pole teeth that protrude in a direction that faces the center of the stator core, to a lead wire. Preferably, the terminal attachment structure includes first and second members protruding outwardly, e.g., radially, from the stator core, and a lead wire fixture having first and second plates separated by first and second legs mechanically coupled to one another to form a unitary structure adapted to engage with the first and second members, where a plurality of wire accepting pins penetrate at least one of the first and second plates. If desired, the terminal attachment structure may also include N fastening mechanisms, where the first and second members include N through holes, each of the first and second plates include N through holes, and the lead wire fixture is coupled to first and second members by the N fastening mechanisms passing through respective ones of the N through holes in the first plate, the N through holes in the first and second members, and the N through holes in the second plate. It will be noted that N can be any integer greater than 1.

In an exemplary case, the first and second plates contact opposing sides of the first and second members. When the thickness of the stator core is a predetermined thickness, the thickness of the lead wire fixture can be greater than or equal to that predetermined thickness. Preferably, the at least one of the first and second plates of the lead wire fixture are formed from a synthetic resin having a predetermined coefficient of thermal expansion. In an exemplary case, a female receptacle extends the gap formed by the first and second plates with the first and second legs parallel to the first and second members. In that case, the receptacle, which is adapted to accept a mating male plug, supports wire-accepting pins bent at a predetermined angle. Preferably, a first end of each of the wire-accepting pins penetrates the first plate, while a second end of each of the wire-accepting pins is disposed in the receptacle.

According to another aspect, the present invention provides a resolver terminal attachment structure for a resolver including a stator core constructed from multiple laminated plates providing multiple stationary magnetic poles with attendant stationary magnetic pole teeth that protrude in a direction that faces the center of a stator yoke, the magnetic poles adapted to accept a stator winding, including a lead wire fixture, which electrically couples the stator winding to a lead wire via attachment pins, and two protrusions formed integrally and unitarily with the stator core at the outside of the stator core for supporting the lead wire fixture between the protrusions.

According to yet another aspect, the present invention provides a lead wire fixture for electrically coupling a rotating machine, having a stator core constructed from multiple laminated plates forming first and second members protruding outwardly, e.g., radially, from the stator core, to a lead wire. The lead wire fixture includes first and second plates disposed parallel to one another, first and second legs disposed at a predetermined angle with respect to one another, each of the first and second legs being fixedly coupled to both the first and second plates, and a plurality of wire accepting pins penetrating at least one of the first and second plates. In an exemplary case, at least one end of each of the wire-accepting pins is disposed substantially perpendicular to the first plate, and the first and second plates and the first and second legs form a unitary structure adapted to engage with the first and second members.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1A is a top view, FIG. 1B is a front view, and FIG. 1C is a cross sectional view taken along the plane represented by the line 1C—1C of FIG. 1A.

FIGS. 2A, 2B, and 2C collectively illustrate an exemplary embodiment of the lead wire fixture, where FIG. 2A is a top view, FIG. 2B is a front view, and FIG. 2C is a right side view;

FIGS. 3A, 3B, and 3C collectively illustrate another exemplary embodiment of the lead wire fixture, where FIG. 3A is a top view, FIG. 3B is a front view, and FIG. 3C is a right side view;

FIGS. 3D and 3E are drawings that show a further embodiment in which the fixture of FIGS. 3A–3C is modified to include an integral connector socket;

FIGS. 4A and 4B collectively illustrate the manner in which the lead wire fixture is attached to the stator in accordance with the present invention, where FIG. 4A is a top view, and FIG. 4B is a front view;

DETAILED DESCRIPTION OF THE PREFERRED EMBODIMENTS

A resolver terminal attachment structure according to the present invention provides a lead wire fixing device, hereinafter simply a lead wire fixture, in a rotating machine, e.g., a resolver including a stator core constructed from multiple laminated plate-shaped bodies providing multiple stationary magnetic poles with attendant stationary magnetic pole teeth that protrude in the direction of the center of a stator yoke. The lead wire fixture, which connects a stator winding that is wound on the stationary magnetic pole teeth of the stator core to a lead wire, engages with two protrusions at the outside of the stator core. The lead wire fixture supports attachment pins that secure at least one of the stator winding and a lead wire. The pins are provided in a standing manner.

It will be appreciated that in the resolver terminal attachment structure described above, through holes advantageously can be respectively formed in the two protrusions provided at the outside of the stator core and in the lead wire fixture, and the lead wire fixture can be secured to the stator core by at least one fixing device that passes through selected ones of the through holes. If desired, the lead wire fixture may have a flange that engages with the two protrusions provided at the outside of the stator core.

Figure 1D:
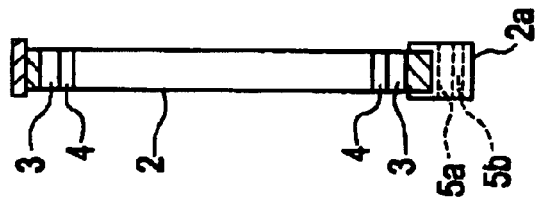
FIG. 1D is a cross sectional view, like FIG. 1C, of an alternative embodiment.
Figure 1C:
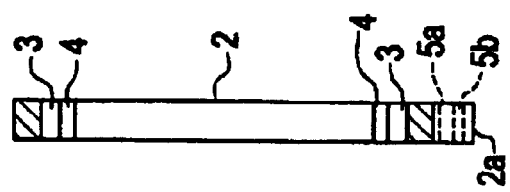
FIGS. 1A, 1B, 1C collectively depict a stator from various angles and illustrate the resolver terminal attachment structure in an exemplary embodiment of the present invention, where
Figure 1A:
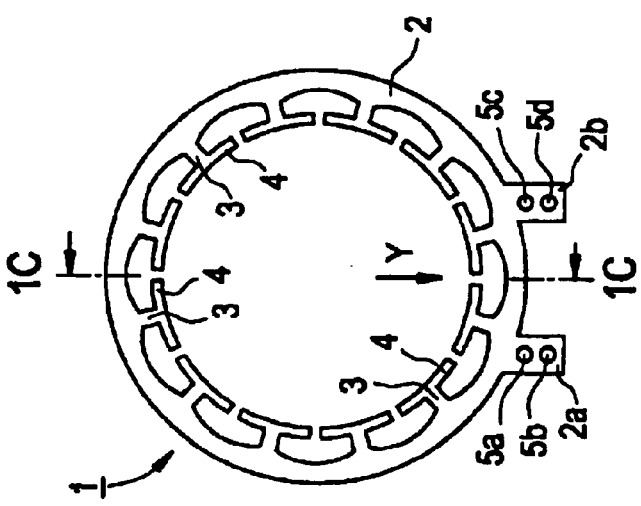
Figure 1B:
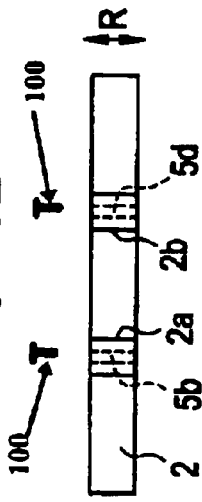
Figure 5:
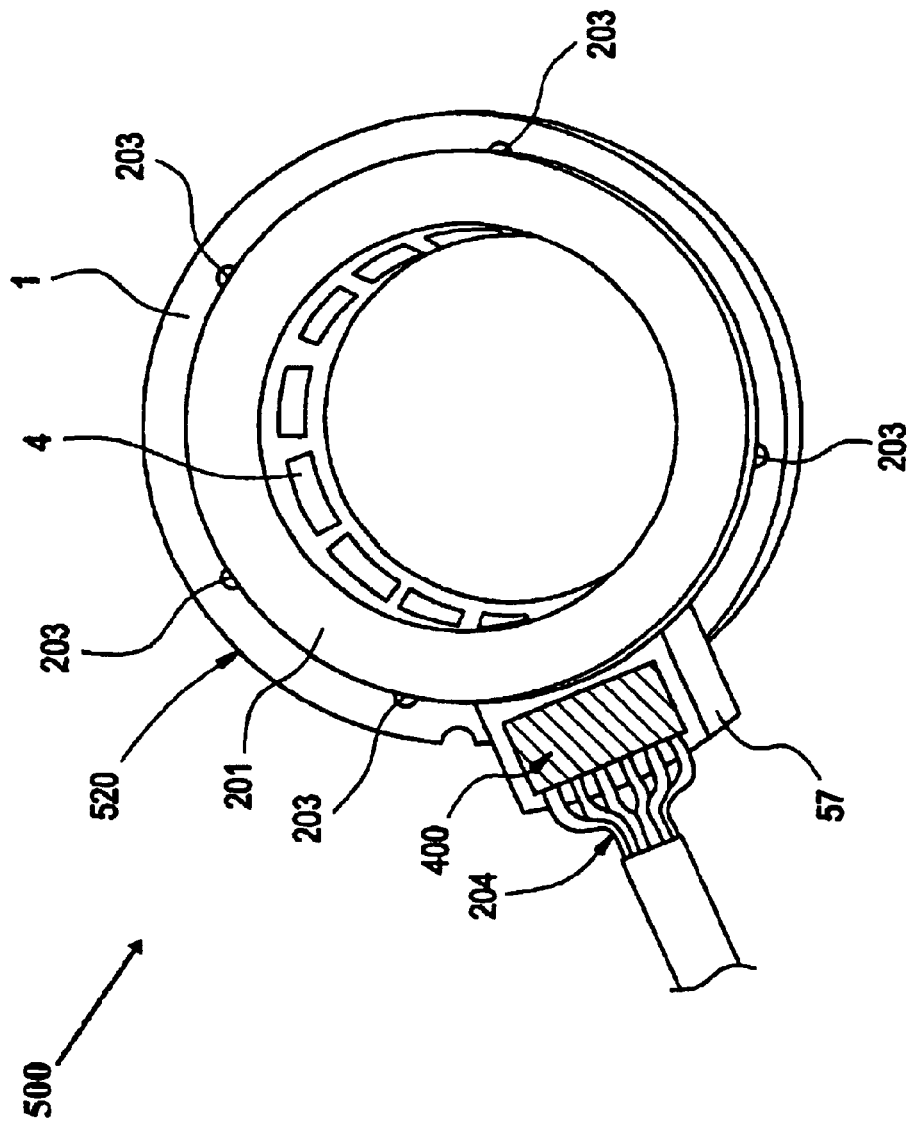
FIG. 5 is an external perspective view of a conventional stator assembly in a variable reluctance resolver.
Figure 6:
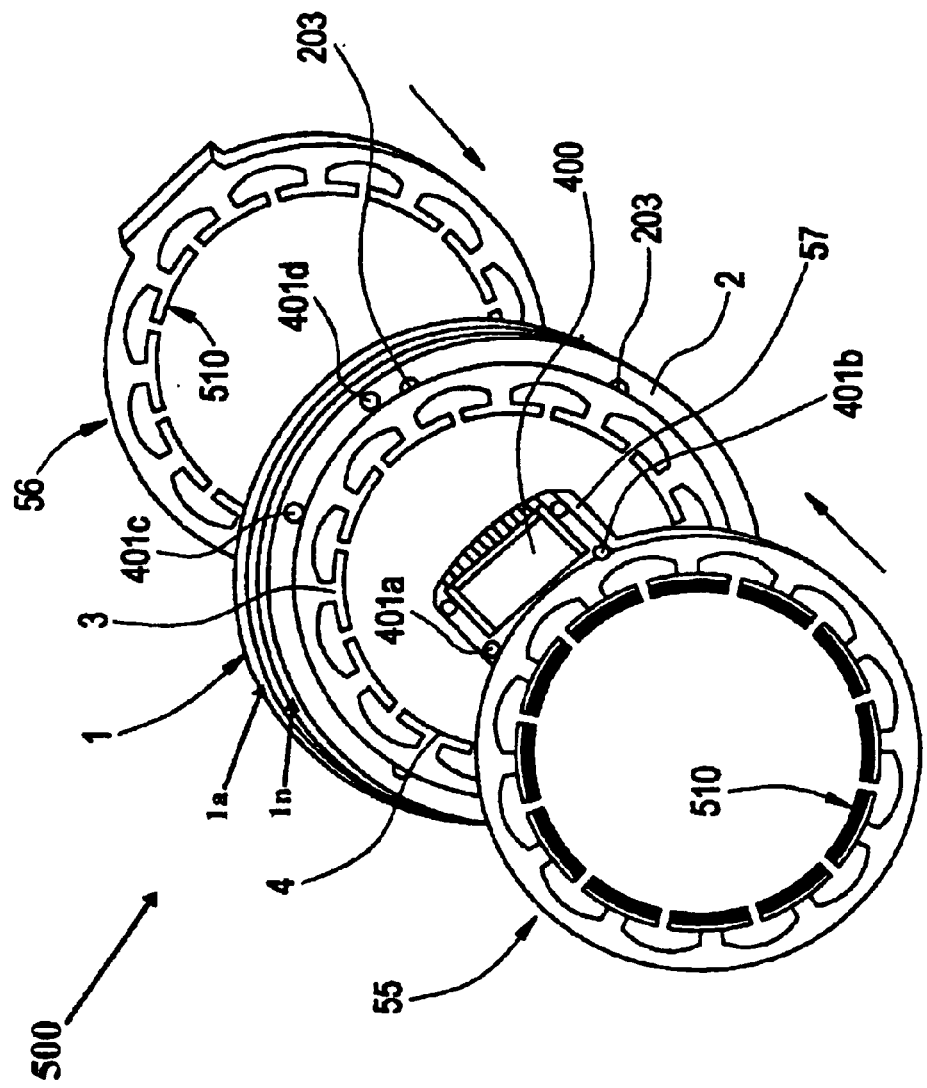
FIG. 6 is an exploded view of a conventional stator assembly in the resolver depicted in FIG. 5.

In the embodiment of FIGS. 1A–1C, the periphery of the stator core 1, including the protrusions 2a and 2b, has a uniform thickness. In the embodiment of FIG. 1D, the periphery of the stator core 1 has a greater thickness than the remainder. In FIGS. 1A–1D, portions that are identical to those of the stator core 1 shown in FIG. 6 are assigned the same reference numbers, and, thus, a detailed explanation of these items will not be repeated.

In FIG. 1A, multiple stationary magnetic poles 3 equipped with stationary magnetic pole teeth 4 protrude in the direction of the center of the yoke 2, i.e., into the center of the stator core 1, while two additional protrusions 2a and 2b, are disposed on and protrude from the outside of the stator core 1. Thus, as shown in FIGS. 1A, 1B, 4A, and 4B, the protrusions 2a, 2b and the stator core 1 are formed by a stack of plates. Through holes generally denoted 5, e.g., holes 5a, 5b, 5c, and 5d, which are employed to secure the lead wire fixture 6 (see the discussion of FIGS. 2A–2C and FIGS. 3A–3E below) are formed in the protrusions 2a and 2b. During assembly, the through holes 5 and the through holes formed in the lead wire fixture 6 (discussed below) formed at positions corresponding thereto are aligned, screws or pins 100 are inserted, and the stator core 1 and the lead wire fixture 6 are further secured by any suitable method, e.g., gluing or caulking.

It will be appreciated that when the two protrusions 2a and 2b are manufactured by a process such as die cutting the yoke 2, the protrusions are formed simultaneously with the multiple stationary magnetic pole teeth 4. Thus, it is possible to reduce manufacturing costs. In addition, since the protrusions 2a, 2b are an integral and unitary part of the structure of the yoke 2, the strength with respect to external forces applied to the two protrusions 2a and 2b is high, minimizing the possibilities of ruptures in the resolver structure occurring in the vicinity of the two protrusions 2a and 2b.

Referring to FIGS. 2A–2C, the lead wire fixture 6 advantageously can be formed from a synthetic resin material, e.g., PBT glass (30%), that has a coefficient of thermal expansion of approximately 0.00003 cm/cm/° C. As best seen in FIG. 2B, plates 10a and 10b, each of which includes flanges 61a and 61b formed on opposite ends, join with upper and lower surfaces (not shown) of the rotation axis direction (the R direction in FIG. 1A) of the two protrusions 2a and 2b. Advantageously, the lead wire fixture 6 includes through holes 6a, 6b, 6c and 6d, which are formed in the flange 61a, and through holes 6f, 6g, 6h, and an unnumbered single through hole (not shown in any of the drawings), which are respectively formed in the flange 61b. It will be appreciated that the through holes of the flanges 61a and 61b are respectively formed at positions that align from top to bottom, as illustrated in FIG. 2B. It will also be appreciated that legs 62a and 62b are disposed perpendicular to the plates 10a and 10b, thus forming a gap 8 bounded by the flanges 61a and 61b and the legs 62a and 62b.

It will be appreciated that while the legs 62a and 62b are illustrated as being parallel to one another, the lead wire fixture according to one aspect of the present invention is not so limited. The projection of the legs 62a, 62b advantageously can intersect with one another, i.e., the legs form an acute angle with respect to one another. This configuration will be particularly useful when the two protrusions 2a, 2b radiate from the stator core 1 rather than project from the stator core while being disposed parallel to one another. Other variations will occur to one of ordinary skill in the art after reading the present disclosure, and all such variations are considered to be within the scope of the present invention.

In the region where the gap 8 defined by the plates 10a and 10b is formed, multiple pins generally denoted 7, e.g., 7a, 7b, 7c, 7d, 7e and 7f, that are employed to secure the stator winding, penetrate both of the plates 10a and 10b. When the two protrusions 2a and 2b provided at the outside of the stator core 1 are fit into recessed portions 9a and 9b formed by legs 62a and 62b and the plates 10a and 10b, the through holes 6a, 6b, 6c, 6d, 6f, 6g, and 6h, and the unnumbered through hole provided in the flange 61a and flange 61b correspond with the through holes generally denoted 5, e.g., holes 5a, 5b, 5c, and 5d, provided in the protrusions 2a and 2b. A stator winding (not shown) advantageously can be wound around pins provided in a standing manner at the plate 10a side, and the lead wire can be wound around pins provided in a standing manner at the plate 10b side. One of the differences between the lead wire fixtures illustrated in FIGS. 2A and 3A lies in the fact that multiple pins 7a', 7b', 7c', 7d', 7e', and 7f', around which either the stator winding or lead wire are wound, are provided in such a manner that they pass through only one of the plates 10a, 10b, e.g., plate 10a. Specifically, each of the multiple pins 7a', 7b', 7c', 7d', 7e', 7f' is bent approximately 90 degrees in the Y direction (shown in FIG. 1A) in the gap 8 formed between the flanges 61a and 61b, and the pins 7a', 7b', 7c', 7d', 7e', 7f' extend out from the lead wire fixture 6' to the exterior. A stator winding (not shown) is wound around pins provided in a standing manner with respect to the plate 10a. In that case, the lead wire is wound around pins that are bent approximately 90 degrees in the Y direction (see FIG. 1A) for an arrow indicating the direction Y).

Alternatively, the lead wire advantageously may be fit into the gap 8 without being wound around the pins 7a'–7f', i.e., the pins that are bent approximately 90 degrees, while a socket that is equipped with pins that respectively engage with the lead wire may be provided in the gap 8. The lead wire may also be connected to pins provided in the socket. In this case, the socket and the lead wire fixture 6' are separated, and the degree of freedom of the assembly increases. In addition, as shown in FIGS. 3D and 3E, a structure that provides a connector socket 11, e.g., a female receptacle, as a unitary element with plates 10a and 10b can also be employed.

In FIGS. 4A and 4B, the pins 7a, 7b, 7c, 7d, 7e, and 7f are not shown. When the two protrusions 2a and 2b provided at the outside of the stator core 1 engage with the recessed portions 9a, 9b of the lead wire fixture 6, the insides of the two protrusions 2a and 2b come into contact with the outsides of the legs 62a and 62c, while the interiors of the flanges 61a and 61b join with both surfaces (taken in the R direction illustrated in FIG. 1A) of the two protrusions 2a and 2b. As a result, movement of the lead wire fixture 6 in the R direction of the stator core 1, which motion would result in separation of the windings from the lead wires in a conventional resolver core, is prevented. In addition, at this time, the through holes formed on flanges 61a and 61b and protrusions 2a and 2b are aligned, allowing the lead wire fixture 6 to be secured to the stator core 1 by fastening mechanisms, e.g., screws or pins through inserted in the through holes. It will be appreciated that other fastening mechanisms, e.g., rivets, advantageously can be employed and that all such mechanisms are considered to be within the scope of the present invention.

Thus, the lead wire is drawn out from the lead wire fixture 6 in this way. Moreover, the stator assembly 520 is completed by enclosing a commonly known stator magnetic pole assembly, such as that shown in FIG. 6, from both side surfaces of the stator core 1. It will be appreciated that the stator magnetic pole assembly advantageously can be formed by a synthetic resin, e.g., PBT glass (30%), that has a coefficient of thermal expansion of 0.00003/cm/cm/° C. Moreover, a coil winding portion of the stator core 1 is provided that has the same shape and quantity of protrusions as the stationary magnetic poles 3 with their respective magnetic pole teeth 4.

Through the resolver terminal attachment structure of the present invention, the lead wire fixture 6 can be attached to the stator core 1 while being separated from the stator magnetic pole assemblies. For this reason, even if an external force were applied to the lead wire fixture 6, the stator core 1, which is formed from strong, silicon steel plates, prevents rupturing of the lead wire fixture 6. In addition, even if an external force was applied to the lead wire fixture 6 but not to the stator winding, i.e., a sheer force is applied, shorting of the winding would be prevented. As a result, resolver reliability improves.

Moreover, the structure of the stator magnetic pole assemblies is simplified by employing a structure in which the lead wire fixture 6 is attached to the stator core 1, and in which the stator magnetic pole assemblies, which are enclosed from both sides of the stator core 1, are identical in shape. In short, it is not necessary to use stator magnetic pole assemblies with respectively different shapes. Thus, the resolver price advantageously can be reduced. Furthermore, in addition to it not being necessary to fill the interior of the lead wire fixture 6 with potting material, it is possible to increase the creeping distance with respect to the stator core 1 by virtue of plates 10a and 10b and flanges 61a and 61b of the lead wire fixture 6 and, as a result, the insulation voltage resistance improves.

A resolver terminal attachment structure according to the present invention advantageously can be included in a resolver provided with a stator core constructed from multiple laminated plate-shaped bodies including multiple stationary magnetic poles equipped with stationary magnetic pole teeth, which protrude in the direction facing the center of a yoke. The resolver terminal attachment structure includes a lead wire fixture that connects a stator winding, which is wound on the stationary magnetic pole teeth of the stator core, to a lead wire routing signals and power between the lead wire and the stator winding(s). Preferably, the resolver terminal attachment structure provides two protrusions at the outside of the stator core, which protrusions accommodate and support the lead wire fixture. Most preferably, the lead wire fixture supports attachment pins, on which the stator winding and a lead wire are wound, which pins penetrate at least one face of the lead wire fixture.

In an exemplary case, through holes are respectively formed in the two protrusions provided at the outside of the stator core and in the lead wire fixture, which holes permit the lead wire fixture to be secured to the stator core by a fixing mechanism that passes through predetermined ones of the through holes. If desired, the lead wire fixture advantageously can have a flange that engages with the two protrusions provided at the outside of the stator core.

It will be appreciated that other configurations of the lead wire fixture advantageously can be employed in the resolver terminal attachment structure without departing from the present invention. For example, while the legs 62a, 62b separating the plates 10a, 10b are illustrated as being displaced from the ends of the plates 10a, 10b, the legs advantageously can be moved to the ends of the plates or additional pairs of legs can be provided at the ends of the plates. Moreover, while the present invention is described with respect to an exemplary resolver, the invention is not so limited. The terminal attachment structure according to the present invention can be adapted to any rotating machinery employing a stator or stator core.

Although presently preferred embodiments of the present invention have been described in detail herein, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A resolver terminal attachment structure for a resolver including a stator core constructed from multiple laminated plates providing multiple stationary magnetic poles that protrude in a direction that faces the center of a stator yoke and have attendant stationary magnetic pole teeth, wherein the magnetic poles are adapted to accept a stator winding, and wherein the resolver terminal attachment structure comprises:

a lead wire fixture, which electrically couples the stator winding to a lead wire with attachment pins; and two protrusions formed integrally and unitarily with the stator core at the outside of the stator core for supporting the lead wire fixture between the protrusions.

2. The resolver terminal attachment structure as recited in claim 1, wherein: through holes are formed in the two protrusions and in the lead wire fixture; and the lead wire fixture is secured to the stator core by at least one fixing device that passes through selected ones of the through holes.

3. The resolver terminal attachment structure as recited in claim 1, wherein the lead wire fixture further comprises at least one flange that engages with the two protrusions.

4. The resolver terminal attachment structure as recited in claim 1, wherein the stator core and the protrusions are formed by a stack of metal plates, and each of the metal plates includes a pair of integral and unitary arms that form the protrusions.

5. The resolver terminal attachment structure as recited in claim 1, wherein the stator core and the protrusions are metal.

6. The resolver terminal attachment structure as recited in claim 2, wherein the lead wire fixture further comprises at least one flange that engages with the two protrusions.

* * * * *